US011626232B2

(12) United States Patent
Hirukawa

(10) Patent No.: US 11,626,232 B2
(45) Date of Patent: Apr. 11, 2023

(54) MULTILAYER COIL COMPONENT

(71) Applicant: Murata Manufacturing Co., Ltd., Kyoto-fu (JP)

(72) Inventor: Atsuo Hirukawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 542 days.

(21) Appl. No.: 16/806,905

(22) Filed: Mar. 2, 2020

(65) Prior Publication Data

US 2020/0286665 A1    Sep. 10, 2020

(30) Foreign Application Priority Data

Mar. 4, 2019  (JP) .............................. JP2019-038545

(51) Int. Cl.
*H01F 17/00* (2006.01)
*H01F 1/34* (2006.01)
(Continued)

(52) U.S. Cl.
CPC ....... *H01F 17/0013* (2013.01); *C04B 35/265* (2013.01); *H01F 1/14* (2013.01);
(Continued)

(58) Field of Classification Search
CPC ...... H01F 17/0013; H01F 1/344; H01F 17/04; H01F 27/255
See application file for complete search history.

(56) References Cited

U.S. PATENT DOCUMENTS 6,157,285 A     12/2000 Tokuda et al.
7,251,120 B2 *  7/2007 Takazawa .............. H01G 4/40
                                            361/321.1
(Continued)

FOREIGN PATENT DOCUMENTS

CN   212461292 U    2/2021
JP   H10-335143 A   12/1998
(Continued)

OTHER PUBLICATIONS

An Office Action mailed by China National Intellectual Property Administration dated Jul. 5, 2021 which corresponds to Chinese Patent Application No. 202010138720.X and is related to U.S. Appl. No. 16/806,905 with English language translation.

(Continued)

*Primary Examiner* — Mang Tin Bik Lian
*Assistant Examiner* — Malcolm Barnes
(74) *Attorney, Agent, or Firm* — Studebaker & Brackett PC

(57) ABSTRACT

A multilayer coil component includes a multilayer body formed by stacking a plurality of insulating layers on top of one another and that has a coil built thereinto, and a first outer electrode and a second outer electrode that are electrically connected to the coil. The coil is formed by electrically connecting a plurality of coil conductors to one another. A first main surface of the multilayer body is a mounting surface. A stacking direction of the multilayer body and an axial direction of the coil are parallel to the mounting surface. The insulating layers between the coil conductors are composed of a material containing at least one out of a magnetic material and a non-magnetic material. A content percentage of the non-magnetic material in the insulating layers changes in a direction from a first end surface toward a second end surface of the multilayer body.

20 Claims, 5 Drawing Sheets

(51) Int. Cl.
*H01F 17/04* (2006.01)
*H01F 27/255* (2006.01)
*C04B 35/26* (2006.01)
*H01F 41/04* (2006.01)
*H01F 1/14* (2006.01)
*H01F 27/32* (2006.01)
*H01F 27/28* (2006.01)

(52) U.S. Cl.
CPC ......... *H01F 1/344* (2013.01); *H01F 17/0006* (2013.01); *H01F 17/04* (2013.01); *H01F 27/255* (2013.01); *H01F 27/2804* (2013.01); *H01F 27/323* (2013.01); *H01F 41/046* (2013.01); *C04B 2235/3279* (2013.01); *C04B 2235/3281* (2013.01); *C04B 2235/3284* (2013.01); *H01F 2017/0066* (2013.01); *H01F 2017/048* (2013.01); *H01F 2027/2809* (2013.01)

(56) References Cited

U.S. PATENT DOCUMENTS

| | | | |
|---|---|---|---|
| 10,600,549 B2 | 3/2020 | Soda | |
| 2005/0018382 A1* | 1/2005 | Takazawa | H01F 17/0013 361/321.2 |
| 2005/0122699 A1* | 6/2005 | Maeda | H01F 17/0013 174/262 |
| 2009/0243784 A1* | 10/2009 | Iwasaki | H01F 17/0013 336/200 |
| 2011/0018673 A1* | 1/2011 | Akazawa | H01F 17/0013 336/200 |
| 2013/0293216 A1* | 11/2013 | Yokoyama | H01F 17/0033 336/200 |
| 2014/0333405 A1* | 11/2014 | Choto | H01F 1/401 336/200 |
| 2015/0371755 A1* | 12/2015 | Im | H01F 27/2804 336/200 |
| 2016/0260539 A1* | 9/2016 | Koizumi | H01F 41/02 |
| 2017/0018351 A1* | 1/2017 | Yatabe | H01F 27/2804 |
| 2017/0345543 A1* | 11/2017 | Soda | C03C 4/00 |
| 2017/0345552 A1* | 11/2017 | Nakano | H01F 27/292 |
| 2020/0105462 A1* | 4/2020 | Nogi | H01F 27/2823 |
| 2020/0286665 A1 | 9/2020 | Hirukawa | |

FOREIGN PATENT DOCUMENTS

| | | |
|---|---|---|
| JP | 2001-196240 A | 7/2001 |
| JP | 2005-109195 A | 4/2005 |
| JP | 2014-220469 A | 11/2014 |
| JP | 2017-210389 A | 11/2017 |
| JP | 2017-212372 A | 11/2017 |

OTHER PUBLICATIONS

An Office Action; "Notice of Reasons for Refusal," mailed by the Japanese Patent Office dated Oct. 26, 2021, which corresponds to Japanese Patent Application No. 2019-038545 and is related to U.S. Appl. No. 16/806,905 with English translation.

* cited by examiner

MULTILAYER COIL COMPONENT

CROSS-REFERENCE TO RELATED APPLICATION

This application claims benefit of priority to Japanese Patent Application No. 2019-038545, filed Mar. 4, 2019, the entire content of which is incorporated herein by reference.

BACKGROUND

Technical Field

The present disclosure relates to a multilayer coil component.

Background Art

As an example of a multilayer coil component, Japanese Unexamined Patent Application Publication No. 2005-109195 discloses "A multilayer coil component that includes a ceramic multilayer body formed by stacking a plurality of ceramic layers and a plurality of inner electrodes on top of one another and a helical coil formed by electrically connecting the plurality of inner electrodes to one another, and in which the magnetic permeability and/or dielectric constant of the ceramic material of the ceramic multilayer body varies in a stepwise or continuous manner in an axial direction of the helical coil".

In response to the increasing communication speed and miniaturization of electronic devices in recent years, it is demanded that multilayer coil components have satisfactory radio-frequency characteristics in a radio-frequency band (for example, a GHz band extending from around 30 GHz). In the disclosure disclosed in Japanese Unexamined Patent Application Publication No. 2005-109195, inductances and stray capacitances generated in the helical coil vary in a stepwise or continuous manner in the axial direction of the helical coil, and as a result a wide-band multilayer coil component in which a resonant frequency is dispersed can be obtained. In the disclosure disclosed in Japanese Unexamined Patent Application Publication No. 2005-109195, the magnetic permeability and/or dielectric constant of the ceramic material is made to vary by incorporating a disappearing material and changing the porosity of the ceramic material. However, it is considered that if the porosity becomes high, there will be a reduction in strength and it will be difficult to sufficiently lower the magnetic permeability and/or dielectric constant, and therefore there will be a reduction in freedom of design. As a result, there is a risk that satisfactory characteristics will not be exhibited when the component is used as a noise absorbing component in a radio-frequency band extending from around 30 GHz.

SUMMARY

Accordingly, the present disclosure provides a multilayer coil component in which a resonant frequency is dispersed, that can be used in a wide band, and that has excellent radio-frequency characteristics.

A multilayer coil component according to a preferred embodiment of the present disclosure includes a multilayer body that is formed by stacking a plurality of insulating layers on top of one another and that has a coil built into the inside thereof; and a first outer electrode and a second outer electrode that are electrically connected to the coil. The coil is formed by electrically connecting a plurality of coil conductors, which are stacked together with insulating layers, to one another. The multilayer body has a first end surface and a second end surface, which face each other in a length direction, a first main surface and a second main surface, which face each other in a height direction perpendicular to the length direction, and a first side surface and a second side surface, which face each other in a width direction perpendicular to the length direction and the height direction. The first outer electrode is arranged so as to cover part of the first end surface and so as to extend from the first end surface and cover part of the first main surface. The second outer electrode is arranged so as to cover part of the second end surface and so as to extend from the second end surface and cover part of the first main surface. The first main surface is a mounting surface. A stacking direction of the multilayer body and an axial direction of the coil are parallel to the mounting surface. The insulating layers located between the coil conductors are composed of a material containing at least one out of a magnetic material and a non-magnetic material. A content percentage of the non-magnetic material contained in the insulating layers changes in a direction from the first end surface toward the second end surface of the multilayer body.

According to the preferred embodiment of the present disclosure, a multilayer coil component can be provided in which a resonant frequency is dispersed, that can be used in a wide band, and that has excellent radio-frequency characteristics.

Other features, elements, characteristics and advantages of the present disclosure will become more apparent from the following detailed description of preferred embodiments of the present disclosure with reference to the attached drawings.

DETAILED DESCRIPTION

Hereafter, a multilayer coil component according to an embodiment of the present disclosure will be described. However, the present disclosure is not limited to the following embodiment and the present disclosure can be applied with appropriate modifications within a range that does not alter the gist of the present disclosure. Combinations consisting of two or more desired configurations among the configurations described below are also included in the scope of the present disclosure.

Figure 1:
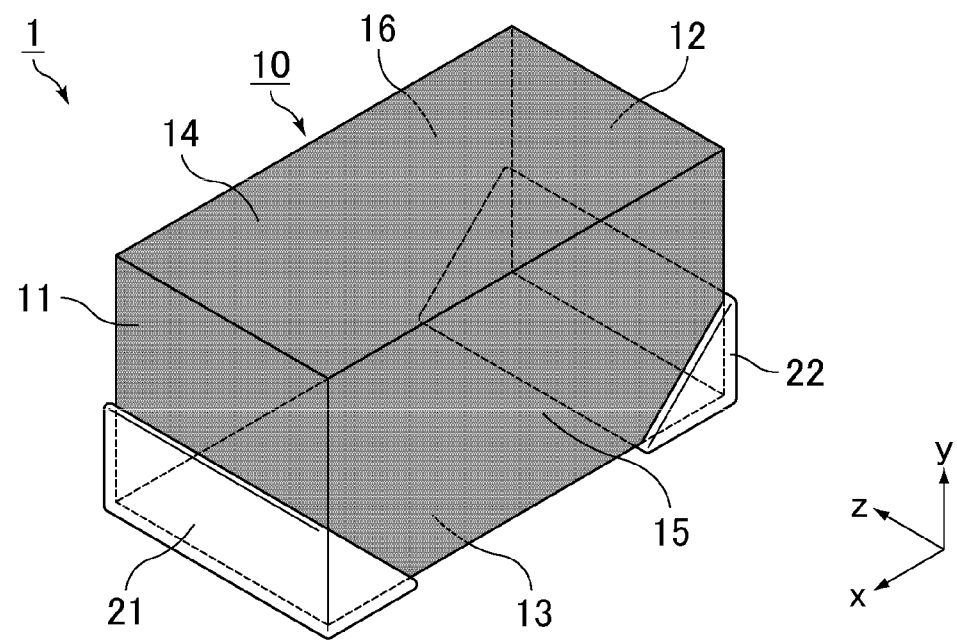
FIG. 1 is a perspective view schematically illustrating a multilayer coil component according to an embodiment of the present disclosure.
Figure 2A:
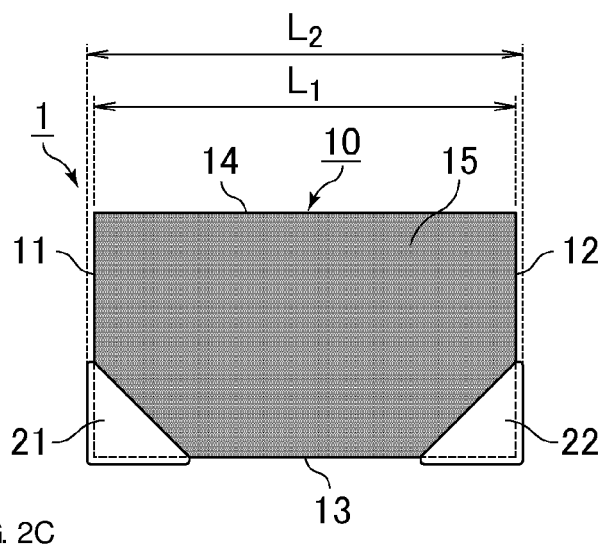
FIG. 2A is a side view of the multilayer coil component illustrated in FIG. 1.
Figure 2B:
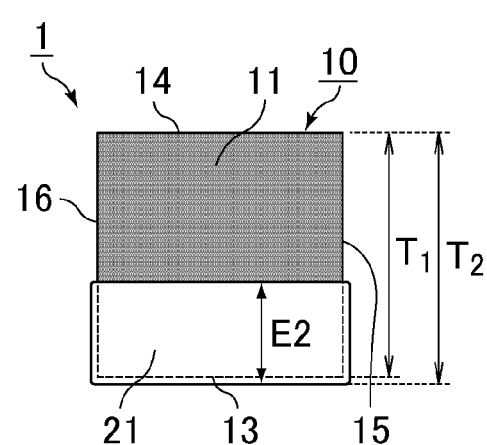
FIG. 2B is a front view of the multilayer coil component illustrated in FIG. 1.
Figure 2C:
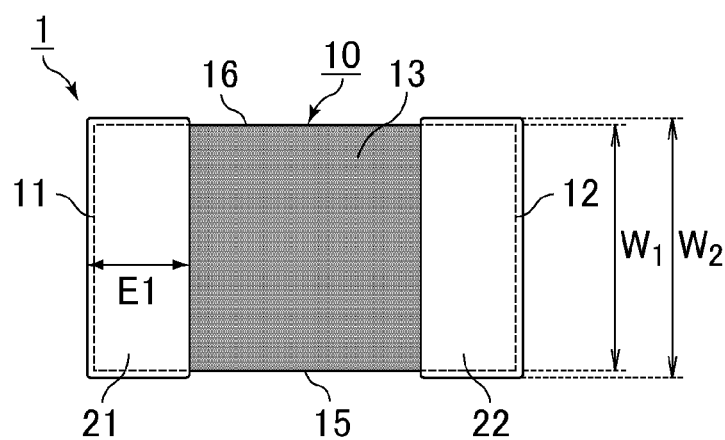
FIG. 2C is a bottom view of the multilayer coil component illustrated in FIG. 1.

FIG. 1 is a perspective view schematically illustrating a multilayer coil component according to an embodiment of the present disclosure. FIG. 2A is a side view of the multilayer coil component illustrated in FIG. 1, FIG. 2B is a front view of the multilayer coil component illustrated in FIG. 1, and FIG. 2C is a bottom view of the multilayer coil component illustrated in FIG. 1.

A multilayer coil component 1 illustrated in FIGS. 1, 2A, 2B, and 2C includes a multilayer body 10, a first outer electrode 21, and a second outer electrode 22. The multilayer body 10 has a substantially rectangular parallelepiped shape having six surfaces. The configuration of the multilayer body 10 will be described later, but the multilayer body 10 is formed by stacking a plurality of insulating layers on top of one another and has a coil built into the inside thereof. The first outer electrode 21 and the second outer electrode 22 are electrically connected to the coil.

In the multilayer coil component 1 and the multilayer body 10 of the embodiment of the present disclosure, a length direction, a height direction, and a width direction are an x direction, a y direction, and a z direction, respectively, in FIG. 1. Here, the length direction (x direction), the height direction (y direction), and a width direction (z direction) are perpendicular to each other.

As illustrated in FIGS. 1, 2A, 2B, and 2C, the multilayer body 10 has a first end surface 11 and a second end surface 12, which face each other in the length direction (x direction), a first main surface 13 and a second main surface 14, which face each other in the height direction (y direction) perpendicular to the length direction, and a first side surface 15 and a second side surface 16, which face each other in the width direction (z direction) perpendicular to the length direction and the height direction.

As illustrated in FIG. 1, in the multilayer body 10, a coil axis a is assumed that is parallel to the length direction (x direction) and penetrates from the first end surface 11 to the second end surface 12. The direction in which the coil axis a extends is the axial direction of the coil that is built into the multilayer body 10. The axial direction of the coil and the stacking direction of the multilayer body 10 are parallel to the first main surface 13, which is a mounting surface.

Although not illustrated in FIG. 1, corner portions and edge portions of the multilayer body 10 are preferably rounded. The term "corner portion" refers to a part of the multilayer body 10 where three surfaces intersect and the term "edge portion" refers to a part of the multilayer body 10 where two surfaces intersect.

The first outer electrode 21 is arranged so as to cover part of the first end surface 11 of the multilayer body 10 as illustrated in FIGS. 1 and 2B and so as to extend from the first end surface 11 and cover part of the first main surface 13 of the multilayer body 10, as illustrated in FIGS. 1 and 2C. As illustrated in FIG. 2B, the first outer electrode 21 covers a region of the first end surface 11 that includes the edge portion that intersects the first main surface 13, but does not cover a region of the first end surface 11 that includes the edge portion that intersects the second main surface 14. Therefore, the first end surface 11 is exposed in the region including the edge portion that intersects the second main surface 14. In addition, the first outer electrode 21 does not cover the second main surface 14.

In FIG. 2B, a height E2 of the part of the first outer electrode 21 that covers the first end surface 11 of the multilayer body 10 is constant, but the shape of the first outer electrode 21 is not particularly limited so long as the first outer electrode 21 covers part of the first end surface 11 of the multilayer body 10. For example, the first outer electrode 21 may have an arch-like shape that increases in height from the ends thereof toward the center thereof on the first end surface 11 of the multilayer body 10. In addition, in FIG. 2C, a length E1 of the part of the first outer electrode 21 that covers the first main surface 13 of the multilayer body 10 is constant, but the shape of the first outer electrode 21 is not particularly limited so long as the first outer electrode 21 covers part of the first main surface 13 of the multilayer body 10. For example, the first outer electrode 21 may have an arch-like shape that increases in length from the ends thereof toward the center thereof on the first main surface 13 of the multilayer body 10.

As illustrated in FIGS. 1 and 2A, the first outer electrode 21 may be additionally arranged so as to extend from the first end surface 11 and the first main surface 13 and cover part of the first side surface 15 and part of the second side surface 16. In this case, as illustrated in FIG. 2A, the parts of the first outer electrode 21 covering the first side surface 15 and the second side surface 16 are preferably formed in a diagonal shape relative to both the edge portion that intersects the first end surface 11 and the edge portion that intersects the first main surface 13. However, the first outer electrode 21 does not have to be arranged so as to cover part of the first side surface 15 and part of the second side surface 16.

The second outer electrode 22 is arranged so as to cover part of the second end surface 12 of the multilayer body 10 and so as to extend from the second end surface 12 and cover part of the first main surface 13 of the multilayer body 10. Similarly to the first outer electrode 21, the second outer electrode 22 covers a region of the second end surface 12 that includes the edge portion that intersects the first main surface 13, but does not cover a region of the second end surface 12 that includes the edge portion that intersects the second main surface 14. Therefore, the second end surface 12 is exposed in the region including the edge portion that intersects the second main surface 14. In addition, the second outer electrode 22 does not cover the second main surface 14.

Similarly to the first outer electrode 21, the shape of the second outer electrode 22 is not particularly limited so long as the second outer electrode 22 covers part of the second end surface 12 of the multilayer body 10. For example, the second outer electrode 22 may have an arch-like shape that increases in height from the ends thereof toward the center thereof on the second end surface 12 of the multilayer body 10. Furthermore, the shape of the second outer electrode 22 is not particularly limited so long as the second outer electrode 22 covers part of the first main surface 13 of the multilayer body 10. For example, the second outer electrode 22 may have an arch-like shape that increases in length from the ends thereof toward the center thereof on the first main surface 13 of the multilayer body 10.

Similarly to the first outer electrode 21, the second outer electrode 22 may be additionally arranged so as to extend from the second end surface 12 and the first main surface 13 and cover part of the first side surface 15 and part of the second side surface 16. In this case, the parts of the second outer electrode 22 covering the first side surface 15 and the second side surface 16 are preferably formed in a diagonal shape relative to both the edge portion that intersects the second end surface 12 and the edge portion that intersects the first main surface 13. However, the second outer electrode 22 does not have to be arranged so as to cover part of the first side surface 15 and part of the second side surface 16.

The first outer electrode 21 and the second outer electrode 22 are arranged in the manner described above, and therefore the first main surface 13 of the multilayer body 10 serves as a mounting surface when the multilayer coil component 1 is mounted on a substrate.

Although the size of the multilayer coil component 1 according to the embodiment of the present disclosure is not particularly limited, the multilayer coil component 1 is preferably the 0603 size, the 0402 size, or the 1005 size.

In the case where the multilayer coil component 1 according to the embodiment of the present disclosure is the 0603 size, the length of the multilayer body 10 (length indicated by double-headed arrow $L_1$ in FIG. 2A) preferably lies in a range of around 0.57 mm to 0.63 mm. In the case where the multilayer coil component 1 according to the embodiment of the present disclosure is the 0603 size, the width of the multilayer body 10 (length indicated by double-headed arrow $W_1$ in FIG. 2C) preferably lies in a range of around 0.27 mm to 0.33 mm. In the case where the multilayer coil component 1 according to the embodiment of the present disclosure is the 0603 size, the height of the multilayer body 10 (length indicated by double-headed arrow $T_1$ in FIG. 2B) preferably lies in a range of around 0.27 mm to 0.33 mm.

In the case where the multilayer coil component 1 according to the embodiment of the present disclosure is the 0603 size, the length of the multilayer coil component 1 (length indicated by double arrow $L_2$ in FIG. 2A) preferably lies in a range of around 0.57 mm to 0.63 mm. In the case where the multilayer coil component 1 according to the embodiment of the present disclosure is the 0603 size, the width of the multilayer coil component 1 (length indicated by double-headed arrow $W_2$ in FIG. 2C) preferably lies in a range of around 0.27 mm to 0.33 mm. In the case where the multilayer coil component 1 according to the embodiment of the present disclosure is the 0603 size, the height of the multilayer coil component 1 (length indicated by double-headed arrow $T_2$ in FIG. 2B) preferably lies in a range of around 0.27 mm to 0.33 mm.

In the case where the multilayer coil component 1 according to the embodiment of the present disclosure is the 0603 size, the length of the part of the first outer electrode 21 that covers the first main surface 13 of the multilayer body 10 (length indicated by double-headed arrow E1 in FIG. 2C) preferably lies in a range of around 0.12 mm to 0.22 mm. Similarly, the length of the part of the second outer electrode 22 that covers the first main surface 13 of the multilayer body 10 preferably lies in a range of around 0.12 mm to 0.22 mm Additionally, in the case where the length of the part of the first outer electrode 21 that covers the first main surface 13 of the multilayer body 10 and the length of the part of the second outer electrode 22 that covers the first main surface 13 of the multilayer body 10 are not constant, it is preferable that the lengths of the longest parts thereof lie within the above-described range.

In the case where the multilayer coil component 1 according to the embodiment of the present disclosure is the 0603 size, the height of the part of the first outer electrode 21 that covers the first end surface 11 of the multilayer body 10 (length indicated by double-headed arrow E2 in FIG. 2B) preferably lies in a range of around 0.10 mm to 0.20 mm. Similarly, the height of the part of the second outer electrode 22 that covers the second end surface 12 of the multilayer body 10 preferably lies in a range of around 0.10 mm to 0.20 mm. In this case, stray capacitances arising from the outer electrodes 21 and 22 can be reduced. In the case where the height of the part of the first outer electrode 21 that covers the first end surface 11 of the multilayer body 10 and the height of the part of the second outer electrode 22 that covers the second end surface 12 of the multilayer body 10 are not constant, it is preferable that the heights of the highest parts thereof lie within the above-described range.

In the case where the multilayer coil component 1 according to the embodiment of the present disclosure is the 0402 size, the length of the multilayer body 10 preferably lies in a range of around 0.38 mm to 0.42 mm and the width of the multilayer body 10 preferably lies in a range of around 0.18 mm to 0.22 mm. In the case where the multilayer coil component 1 according to the embodiment of the present disclosure is the 0402 size, the height of the multilayer body 10 preferably lies in a range of around 0.18 mm to 0.22 mm.

In the case where the multilayer coil component 1 according to the embodiment of the present disclosure is the 0402 size, the length of the multilayer coil component 1 preferably lies in a range of around 0.38 mm to 0.42 mm. In the case where the multilayer coil component 1 according to the embodiment of the present disclosure is the 0402 size, the width of the multilayer coil component 1 preferably lies in a range of around 0.18 mm to 0.22 mm. In the case where the multilayer coil component 1 according to the embodiment of the present disclosure is the 0402 size, the height of the multilayer coil component 1 preferably lies in a range of around 0.18 mm to 0.22 mm.

In the case where the multilayer coil component 1 according to the embodiment of the present disclosure is the 0402 size, the length of the part of the first outer electrode 21 that covers the first main surface 13 of the multilayer body 10 preferably lies in a range of around 0.08 mm to 0.15 mm. Similarly, the length of the part of the second outer electrode 22 that covers the first main surface 13 of the multilayer body 10 preferably lies in a range of around 0.08 mm to 0.15 mm.

In the case where the multilayer coil component 1 according to the embodiment of the present disclosure is the 0402 size, the height of the part of the first outer electrode 21 that covers the first end surface 11 of the multilayer body 10 preferably lies in a range of around 0.06 mm to 0.13 mm. Similarly, the height of the part of the second outer electrode 22 that covers the second end surface 12 of the multilayer body 10 preferably lies in a range of around 0.06 mm to 0.13 mm. In this case, stray capacitances arising from the outer electrodes 21 and 22 can be reduced.

In the case where the multilayer coil component 1 according to the embodiment of the present disclosure is the 1005 size, the length of the multilayer body 10 preferably lies in a range of around 0.95 mm to 1.05 mm and the width of the multilayer body 10 preferably lies in a range of around 0.45 mm to 0.55 mm. In the case where the multilayer coil component 1 according to the embodiment of the present disclosure is the 1005 size, the height of the multilayer body 10 preferably lies in a range of around 0.45 mm to 0.55 mm.

In the case where the multilayer coil component 1 according to the embodiment of the present disclosure is the 1005 size, the length of the multilayer coil component 1 preferably lies in a range of around 0.95 mm to 1.05 mm. In the case where the multilayer coil component 1 according to the embodiment of the present disclosure is the 1005 size, the width of the multilayer coil component 1 preferably lies in a range of around 0.45 mm to 0.55 mm. In the case where the multilayer coil component 1 according to the embodiment of the present disclosure is the 1005 size, the height of the multilayer coil component 1 preferably lies in a range of around 0.45 mm to 0.55 mm.

In the case where the multilayer coil component 1 according to the embodiment of the present disclosure is the 1005 size, the length of the part of the first outer electrode 21 that covers the first main surface 13 of the multilayer body 10 preferably lies in a range of around 0.20 mm to 0.38 mm. Similarly, the length of the part of the second outer electrode 22 that covers the first main surface 13 of the multilayer body 10 preferably lies in a range of around 0.20 mm to 0.38 mm.

In the case where the multilayer coil component 1 according to the embodiment of the present disclosure is the 1005 size, the height of the part of the first outer electrode 21 that covers the first end surface 11 of the multilayer body 10 preferably lies in a range of around 0.15 mm to 0.33 mm. Similarly, the height of the part of the second outer electrode 22 that covers the second end surface 12 of the multilayer body 10 preferably lies in a range of around 0.15 mm to 0.33 mm. In this case, stray capacitances arising from the outer electrodes 21 and 22 can be reduced.

Figure 3:
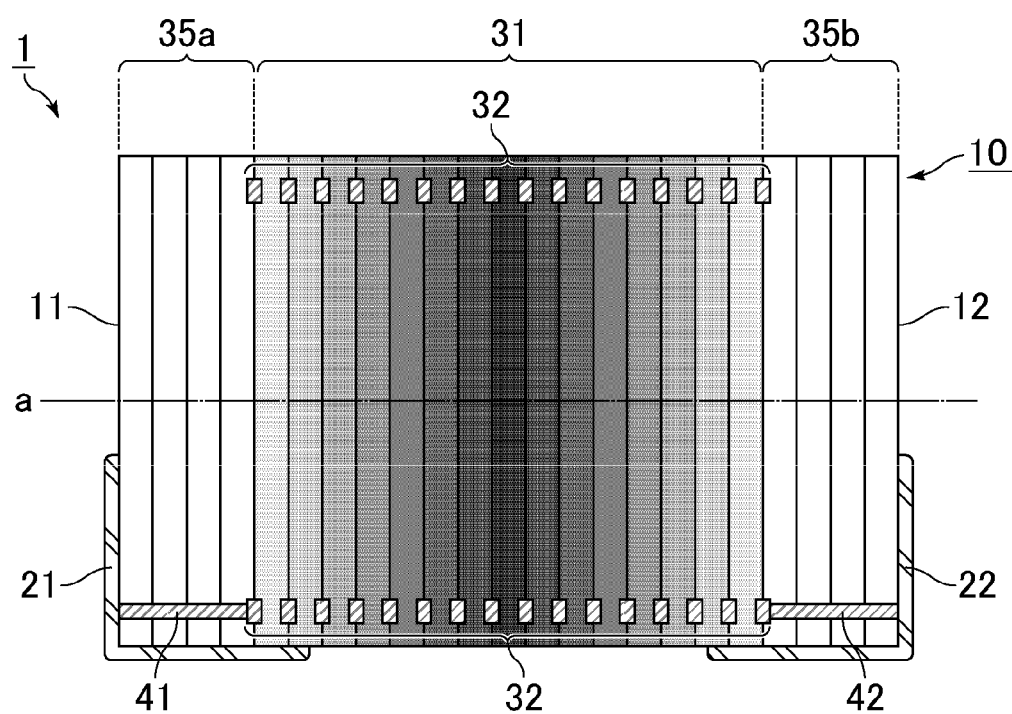
FIG. 3 is a sectional view schematically illustrating the internal structure of the multilayer coil component.

In the multilayer coil component 1 according to the embodiment of the present disclosure, insulating layers located between coil conductors are composed of a material containing at least one out of a magnetic material and a non-magnetic material. The content percentage of a non-magnetic material included in the insulating layers changes in a direction from the first end surface 11 toward the second end surface 12 of the multilayer body 10. FIG. 3 is a sectional view schematically illustrating the internal structure of the multilayer coil component 1. FIG. 3 illustrates insulating layers, coil conductors, connection conductors, and a stacking direction of the multilayer body 10 in a schematic manner, and the actual shape, connections, and so forth are not accurately illustrated. For example, the coil conductors are connected to each other by via conductors.

As illustrated in FIG. 3, the multilayer coil component 1 includes a multilayer body 10 in which a plurality of insulating layers 31 are stacked on top of one another and that has a coil built into the inside thereof. The coil is formed by electrically connecting a plurality of coil conductors 32, which are stacked together with the insulating layers 31, to one another. The stacking direction of the multilayer body 10 and the axial direction of the coil (coil axis a illustrated in FIG. 3) are parallel to the first main surface 13, which is the mounting surface.

In the multilayer coil component 1 illustrated in FIG. 3, the first outer electrode 21 and the coil conductor 32 that faces the first outer electrode 21 are connected to each other by a first connection conductor 41 in a straight line and the second outer electrode 22 and the coil conductor 32 that faces the second outer electrode 22 are connected to each other by a second connection conductor 42 in a straight line. The first connection conductor 41 and the second connection conductor 42 are connected to the respective coil conductors 32 at the parts of the coil conductors 32 that are closest to the first main surface 13, which is the mounting surface. The first connection conductor 41 and the second connection conductor 42 overlap the coil conductors 32 in a plan view from the stacking direction and are positioned closer to the first main surface 13, which is the mounting surface, than the center axes of the coil conductors 32. Since the first connection conductor 41 and the second connection conductor 42 are both connected to the coil conductors 32 at the parts of the coil conductors 32 that are closest to the mounting surface, the outer electrodes can be reduced in size and the radio-frequency characteristics can be improved.

As illustrated in FIG. 3, a plurality of insulating layers are stacked in the multilayer coil component 1. As the insulating layers, the insulating layers 31 located between the coil conductors 32, insulating layers 35a located around the first connection conductor 41, and insulating layers 35b located around the second connection conductor 42 are provided. In FIG. 3, the manner in which the content percentage of the non-magnetic material included in the insulating layers 31 changes in a direction from the first end surface 11 toward the second end surface 12 of the multilayer body 10 has been illustrated by changing the gradation of hatching in the insulating layers 31 between the coil conductors 32. Hatching that is closer to black represents a higher content percentage of the non-magnetic material, and a case is illustrated in FIG. 3 in which the content percentage of the non-magnetic material included in the insulating layers 31 is highest around the center of the multilayer body 10.

"The content percentage of the non-magnetic material included in the insulating layers 31 changes in the direction from the first end surface 11 toward the second end surface 12 of the multilayer body 10" does not mean that the content percentage of the non-magnetic material monotonically increases or monotonically decreases in the direction from the first end surface 11 toward the second end surface 12 of the multilayer body 10. It means that the content percentages of the non-magnetic material included in the insulating layers 31 of the multilayer body 10 are not identical in the individual insulating layers 31 and instead the content percentages of the non-magnetic material included in the individual insulating layers 31 are different from one another. Since the magnetic permeabilities and dielectric constants are different in every insulating layer 31 due to the content percentage of the non-magnetic material included in the insulating layers 31 being different in every insulating layer 31, the inductances and stray capacitances generated in the helical coil change in a step wise or continuous manner in the axial direction of the helical coil, and a wide-band multilayer coil component in which a resonant frequency is dispersed can be obtained. In the multilayer coil component 1 according to the embodiment of the present disclosure, since there is no need to change the porosity of the insulating layers in order to change the magnetic permeabilities and dielectric constants of the insulating layers, a situation in which the strength of the multilayer coil component 1 is decreased is avoided.

A ferrite material is an example of the magnetic material included in the insulating layers. It is preferable that the ferrite material be a Ni—Zn—Cu ferrite material. In addition, it is preferable that the ferrite material contain Fe in the form of $Fe_2O_3$ at around 40 to 49.5 mol %, Zn in the form of ZnO at around 2 to 35 mol %, Cu in the form of CuO at around 6 to 13 mol %, and Ni in the form of NiO at around 10 to 45 mol %. The ferrite material may also include inevitable impurities.

An example of the non-magnetic material included in the insulating layers is an oxide material containing Si and Zn (hereafter, also referred to as a first non-magnetic material). An example of such a material is a material represented by a general formula $aZnO$—$SiO_2$ and is a material having a value of a, that is, the content of Zn with respect to Si (Zn/Si) that lies in a range of around 1.8 to 2.2. This material is also called willemite. In addition, it is preferable that the material further include Cu and specifically the material may be a material in which some of the Zn has been replaced with a dissimilar metal such as Cu. Such a material can be prepared by blending oxide raw materials ($ZnO$, $SiO_2$, $CuO$, etc.) so that the materials are at a prescribed molar ratio and mixing and pulverizing the materials in a wet state, and then calcining the mixture at a temperature in a range of around 1000 to 1200° C.

Furthermore, another example of the non-magnetic material included in the insulating layers (hereafter, also referred to as a second non-magnetic material) is a material that includes a material obtained by adding a filler to a glass material containing Si, K, and B, the filler containing at least one selected from a group consisting of quartz and alumina. The glass material is preferably a material containing Si in the form of $SiO_2$ at around 70 to 85 wt %, B in the form of $B_2O_3$ at around 10 to 25 wt %, K in the form of $K_2O$ at around 0.5 to 5 wt %, and Al in the form of $Al_2O_3$ at around 0 to 5 wt %. This material can be prepared by mixing together a glass and a filler. For example, the material can be prepared by mixing together around 40 to 60 parts by weight of quartz and around 0 to 10 parts by weight of alumina as a filler with respect to 100 parts by weight of glass.

As a combination of the ferrite material and a nonmagnetic material, the ferrite material and the first non-magnetic material may be combined or the ferrite material and the second nonmagnetic material may be combined. In addition, the ferrite material, the first non-magnetic material, and the second non-magnetic material may be combined. The combination consisting of the ferrite material and the first non-magnetic material is preferable.

The percentage of non-magnetic material contained in the insulating layers lies in a range of around 0 to 100 vol %. The percentage of nonmagnetic material contained in the insulating layers of the multilayer body 10 may be different for each insulating layer, but the percentage of nonmagnetic material contained in the insulating layers having the highest percentage of nonmagnetic material is preferably in a range of around 70 to 80 vol %. In addition, the percentage of non-magnetic material contained in the insulating layers having the lowest percentage of non-magnetic material is preferably in a range of around 20 to 30 vol %.

The dielectric constants of the insulating layers are changed by changing the percentages of non-magnetic material contained in the insulating layers. It is preferable that the dielectric constants of the insulating layers lie in a range of around 4.0 to 15.0.

Furthermore, it is preferable that the dielectric constants of the insulating layers located around the connection conductors (the insulating layers around the first connection conductor and the insulating layers located around the second connection conductor) be lower than the dielectric constants of the insulating layers located between the coil conductors. This means that the dielectric constants of the insulating layers 35a located around the first connection conductor 41 and the dielectric constants of the insulating layers 35b located around the second connection conductor 42 are lower than the dielectric constants of the insulating layers having the lowest dielectric constants among the insulating layers 31 located between the coil conductors 32 in FIG. 3. This configuration is preferable because the electrostatic capacitances generated between the outer electrodes and the connection conductors are small when the dielectric constants of the insulating layers located around the connection conductors are low.

Figure 4:
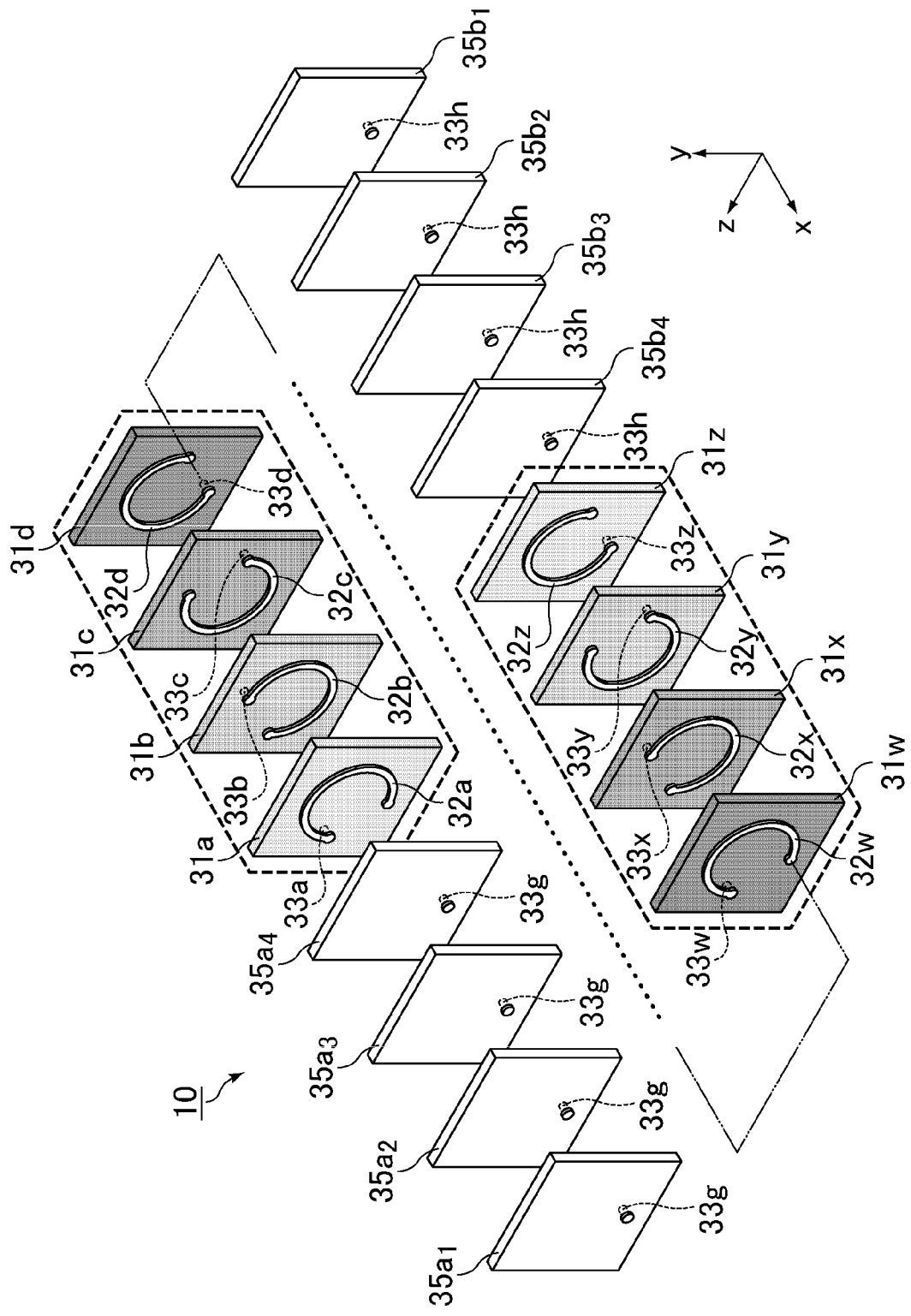
FIG. 4 is an exploded perspective view schematically illustrating an example of a multilayer body of the multilayer coil component illustrated in FIG. 3.
Figure 5:
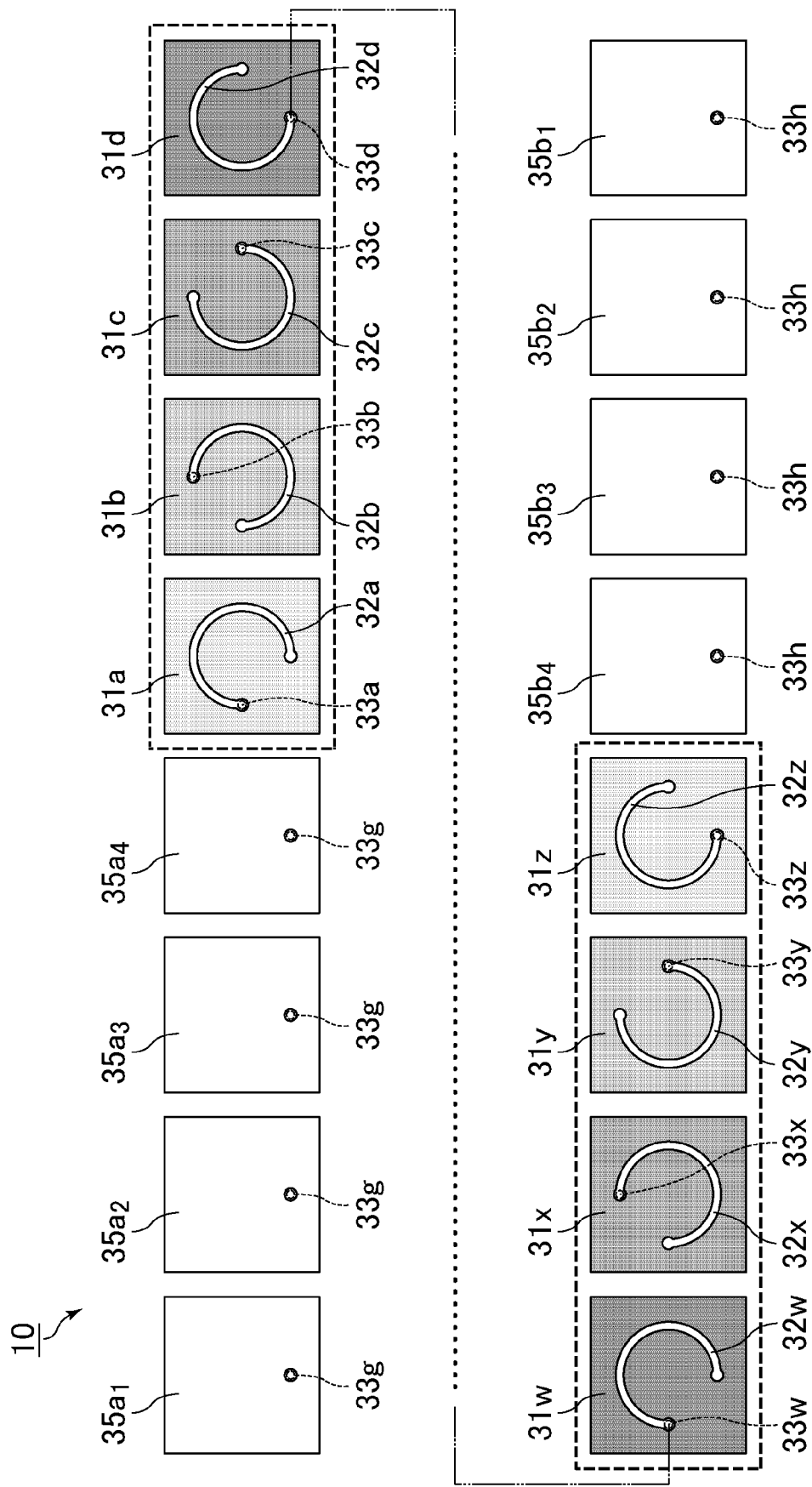
FIG. 5 is an exploded plan view schematically illustrating the example of the multilayer body of the multilayer coil component illustrated in FIG. 3.

FIG. 4 is an exploded perspective view schematically illustrating an example of the multilayer body 10 of the multilayer coil component 1 illustrated in FIG. 3 and FIG. 5 is an exploded plan view schematically illustrating the example of the multilayer body 10 of the multilayer coil component 1 illustrated in FIG. 3.

As illustrated in FIGS. 4 and 5, the multilayer body 10 includes insulating layers 31a, 31b, 31c, and 31d, intermediate insulating layers, which are not illustrated, and insulating layers 31w, 31x, 31y, and 31z as the insulating layers 31 located between the coil conductors 32. In addition, the multilayer body 10 includes insulating layers $35a_1$, $35a_2$, $35a_3$, and $35a_4$ as the insulating layers 35a located around the first connection conductor 41 and insulating layers $35b_1$, $35b_2$, $35b_3$, and $35b_4$ as the insulating layers 35b located around the second connection conductor 42. The multilayer body 10 is formed by stacking these insulating layers in the length direction (x direction). The direction in which the plurality of insulating layers of the multilayer body 10 are stacked is called the stacking direction.

Coil conductors 32a, 32b, 32c, and 32d and via conductors 33a, 33b, 33c, and 33d are respectively provided on and in the insulating layers 31a, 31b, 31c, and 31d. Coil conductors 32w, 32x, 32y, and 32z and via conductors 33w, 33x, 33y, and 33z are respectively provided on and in the insulating layers 31w, 31x, 31y, and 31z.

Via conductors 33g are provided in the insulating layers $35a_1$, $35a_2$, $35a_3$, and $35a_4$. The via conductors 33g are connected together and form the first connection conductor 41. Via conductors 33h are provided in the insulating layers $35b_1$, $35b_2$, $35b_3$, and $35b_4$. The via conductors 33h are connected together and form the second connection conductor 42.

The coil conductors 32a, 32b, 32c, and 32d are respectively provided on main surfaces of the insulating layers 31a, 31b, 31c, and 31d and are stacked together with the insulating layers 31a, 31b, 31c, and 31d. In FIGS. 4 and 5, each coil conductor is shaped so as to extend through ¾ of a turn and the coil conductors 32a, 32b, 32c, and 32d are repeatedly stacked as one unit (three turns).

The insulating layers 31a, 31b, 31c, and 31d are insulating layers in which there are different content percentages of non-magnetic material contained in the insulating layers. The manner in which the content percentages of non-magnetic material contained in the insulating layers 31a, 31b, 31c, and 31d change has been illustrated by changing the gradation of the hatching.

The via conductors 33a, 33b, 33c, and 33d are provided so as to respectively penetrate through the insulating layers 31a, 31b, 31c, and 31d in the thickness direction (x direction in FIG. 4). Normally, lands connected to the via conductors are provided on the main surfaces of the insulating layers. The lands are preferably slightly larger in size than the line width of the coil conductors.

The thus-configured insulating layers 31a, 31b, 31c, and 31d are stacked on top of one another in the x direction as illustrated in FIG. 4. Thus, the coil conductors 32a, 32b, 32c, and 32d are electrically connected to each other by the via conductors 33a, 33b, 33c, and 33d. As a result, a solenoid coil having a coil axis that extends in the x direction is formed inside the multilayer body 10.

In addition, similarly, the insulating layers 31w, 31x, 31y, and 31z are insulating layers in which there are different content percentages of non-magnetic material contained in the insulating layers. Similar coil conductors 32w, 32x, 32y, and 32z and via conductors 33w, 33x, 33y, and 33z are respectively provided on and in the insulating layers 31w, 31x, 31y, and 31z. Therefore, the coil conductors 32w, 32x, 32y, and 32z are electrically connected to each other by the via conductors 33w, 33x, 33y, and 33z by stacking the insulating layers 31w, 31x, 31y, and 31z on top of one another in the x direction illustrated in FIG. 4. As a result, a solenoid coil having a coil axis that extends in the x direction is formed inside the multilayer body 10.

The insulating layers located between the insulating layers 31a, 31b, 31c, and 31d and the insulating layers 31w, 31x, 31y, and 31z are also made to have different content percentages of non-magnetic material contained in the insulating layers. In addition, the same configurations can be adopted for the coil conductors and via conductors.

The first connection conductor 41 and the second connection conductor 42 are exposed at the two end surfaces 11 and 12 of the multilayer body 10. The first connection conductor 41 is connected between the first outer electrode 21 and the coil conductor 32a that faces the first outer electrode 21 inside the multilayer body 10. In addition, the second connection conductor 42 is connected between the second outer electrode 22 and the coil conductor 32z that faces the second outer electrode 22.

The repeating shape of the coil conductors is not particularly limited and may be a substantially circular shape or may be a substantially polygonal shape. In the case where the repeating shape of the coil conductors is a substantially polygonal shape, the coil diameter is the diameter of an area-equivalent circle of the polygonal shape and the coil axis is an axis that passes through the center of the polygonal shape and is parallel to the length direction.

In the case where the multilayer coil component 1 according to the embodiment of the present disclosure is the 0603 size, the inner diameter of the coil conductors preferably lies in a range of around 50 μm to 100 μm.

In the case where the multilayer coil component 1 according to the embodiment of the present disclosure is the 0402 size, the inner diameter of the coil conductors preferably lies in a range of around 30 μm to 70 μm.

In the case where the multilayer coil component 1 according to the embodiment of the present disclosure is the 1005 size, the inner diameter of the coil conductors preferably lies in a range of around 80 μm to 170 μm.

The line width of the coil conductors in a plan view from the stacking direction is not particularly limited but is preferably in a range of around 10% to 30% of the width of the multilayer body 10. When the line width of the coil conductors is less than around 10% of the width of the multilayer body 10, a direct-current resistance Rdc may become large. On the other hand, when the line width of the coil conductors exceeds around 30% of the width of the multilayer body 10, the electrostatic capacitance of the coil may become large and the radio-frequency characteristics may be degraded.

In the case where the multilayer coil component 1 according to the embodiment of the present disclosure is the 0603 size, the line width of the coil conductors preferably lies in a range of around 30 μm to 90 μm and more preferably lies in a range of around 30 μm to 70 μm.

In the case where the multilayer coil component 1 according to the embodiment of the present disclosure is the 0402 size, the line width of the coil conductors preferably lies in a range of around 20 μm to 60 μm and more preferably lies in a range of around 20 μm to 50 μm.

In the case where the multilayer coil component 1 according to the embodiment of the present disclosure is the 1005 size, the line width of the coil conductors preferably lies in a range of around 50 μm to 150 μm and more preferably lies in a range of around 50 μm to 120 μm.

The inner diameter of the coil conductors in a plan view from the stacking direction is preferably in a range of around 15% to 40% of the width of the multilayer body 10.

The inter coil conductor distance in the stacking direction preferably lies in a range of around 3 μm to 7 μm in the multilayer coil component 1 according to the embodiment of the present disclosure. As a result of making the inter coil conductor distance in the stacking direction lie in a range of around 3 μm to 7 μm, the number of turns of the coil can be increased and therefore the impedance can be increased. Furthermore, a transmission coefficient S21 in a radio-frequency band can also be increased as described later.

It is preferable that a first connection conductor and a second connection conductor be provided inside the multilayer body 10 of the multilayer coil component 1. The shapes of the first connection conductor and the second connection conductor are not especially restricted, but it is preferable that the first connection conductor and the second connection conductor be each connected in a straight line between an outer electrode and a coil conductor. By connecting the first connection conductor and the second connection conductor from the coil conductors to the outer electrodes in straight lines, lead out parts can be simplified and the radio-frequency characteristics can be improved.

In the case where the multilayer coil component 1 according to the embodiment of the present disclosure is the 0603 size, the lengths of the first connection conductor and the second connection conductor preferably lie in a range of around 15 μm to 45 μm and more preferably lie in a range of around 15 μm to 30 μm.

In the case where the multilayer coil component 1 according to the embodiment of the present disclosure is the 0402 size, the lengths of the first connection conductor and the second connection conductor preferably lie in a range of around 10 μm to 30 μm and more preferably lie in a range of around 10 μm to 25 μm.

In the case where the multilayer coil component 1 according to the embodiment of the present disclosure is the 1005 size, the lengths of the first connection conductor and the second connection conductor preferably lie in a range of around 25 μm to 75 μm and more preferably lie in a range of around 25 μm to 50 μm.

It is preferable that the first connection conductor and the second connection conductor overlap the coil conductors in a plan view from the stacking direction and be positioned closer to the mounting surface than the center axis of the coil. Here, the center axis of the coil is an axis that passes through the center of the repeating shape formed by the coil conductors and is parallel to the length direction.

Provided that via conductors forming a connection conductor overlap in a plan view from the stacking direction, the via conductors forming the connection conductor do not have to be precisely aligned in a straight line.

The width of the first connection conductor and the width of the second connection conductor preferably each lie in a range of around 8% to 20% of the width of the multilayer body 10. The "width of the connection conductor" refers to the width of the narrowest part of the connection conductor. That is, when a connection conductor includes a land, the shape of the connection conductor is the shape obtained by removing the land.

In the case where the multilayer coil component 1 according to the embodiment of the present disclosure is the 0603 size, the widths of the connection conductors preferably lie in a range of around 30 μm to 60 μm.

In the case where the multilayer coil component 1 according to the embodiment of the present disclosure is the 0402 size, the widths of the connection conductors preferably lie in a range of around 20 μm to 40 μm.

In the case where the multilayer coil component 1 according to the embodiment of the present disclosure is the 1005 size, the widths of the connection conductors preferably lie in a range of around 40 μm to 100 μm.

In the multilayer coil component 1 according to the embodiment of the present disclosure, the lengths of the first connection conductor and the second connection conductor preferably lie in a range of around 2.5% to 7.5% of the length of the multilayer body 10 and more preferably lie in a range of around 2.5% to 5.0% of the length of the multilayer body 10.

In the multilayer coil component 1 according to the embodiment of the present disclosure, there may be two or more of the first connection conductor and the second connection conductor. A case where there are two or more connection conductors indicates a state where a part of an outer electrode covering an end surface and the coil conductor facing that outer electrode are connected to each other in at least two places by the connection conductors.

The multilayer coil component 1 according to the embodiment of the present disclosure has excellent radio-frequency characteristics in a radio-frequency band (in particular, in a range of around 30 GHz to 80 GHz). Specifically, the transmission coefficient S21 at around 40 GHz preferably lies in a range of around −1 dB to 0 dB and the transmission coefficient S21 at around 50 GHz preferably lies in a range of around −2 dB to 0 dB. The transmission coefficient S21 is obtained from a ratio of the power of a transmitted signal to the power of an input signal. The transmission coefficient S21 is basically a dimensionless quantity, but is usually expressed in dB using the common logarithm. When the above conditions are satisfied, for example, the multilayer coil component 1 can be suitably used in a bias tee circuit or the like inside an optical communication circuit.

Hereafter, an example of a method of manufacturing the multilayer coil component 1 according to the embodiment of the present disclosure will be described.

First, ceramic green sheets, which are insulating layers, are manufactured. For example, an organic binder such as a polyvinyl butyral resin, an organic solvent such as ethanol or toluene, and a dispersant are added to a magnetic material and a non-magnetic material and kneaded to form a slurry. After that, ceramic green sheets having a thickness of around 12 μm are obtained using a method such as a doctor blade technique.

For example, as a ferrite raw material serving as the magnetic material, a Ni—Zn—Cu ferrite material (oxide mixed powder) having an average particle diameter of about 2 μm can be used that is obtained by mixing together iron, nickel, zinc and copper oxide raw materials, calcining the raw materials at around 800° C. for around one hour, pulverizing the mixture using a ball mill, and then drying the resulting mixture. In addition, it is preferable that the ferrite material contain Fe in the form of $Fe_2O_3$ at around 40 to 49.5 mol %, Zn in the form of ZnO at around 2 to 35 mol %, Cu in the form of CuO at around 6 to 13 mol %, and Ni in the form of NiO at around 10 to 45 mol %.

As the non-magnetic material, an oxide material containing Si and Zn (above-described first non-magnetic material) can be used. Such a material can be prepared by blending oxide raw materials ($ZnO$, $SiO_2$, $CuO$, etc.) so that the materials are at a prescribed molar ratio and mixing and pulverizing the materials in a wet state, and then calcining the mixture at a temperature in a range of around 1000 to 1200° C.

Furthermore, as the non-magnetic material, a material (above-described second non-magnetic material) that includes a material obtained by adding a filler to a glass material containing Si, K, and B, the filler containing at least one selected from a group consisting of quartz and alumina can be used. The glass material is preferably a material containing Si in the form of $SiO_2$ at around 70 to 85 wt %, B in the form of $B_2O_3$ at around 10 to 25 wt %, K in the form of $K_2O$ at around 0.5 to 5 wt %, and Al in the form of $Al_2O_3$ at around 0 to 5 wt %. This material can be prepared by mixing together a glass and a filler. For example, the material can be prepared by mixing together around 40 to 60 parts by weight of quartz and around 0 to 10 parts by weight of alumina as a filler with respect to 100 parts by weight of glass.

A plurality of different ceramic green sheets having different content percentages of the nonmagnetic material are manufactured by changing the mixing ratio of the magnetic material and the nonmagnetic material. It is preferable that there be at least five different ceramic green sheets. The ceramic green sheets are separated taking the stacking order into consideration.

Via holes having a diameter of around 20 μm to 30 μm are formed by subjecting the manufactured ceramic green sheets to prescribed laser processing. Using a Ag paste on specific sheets having via holes, the coil sheets are formed by filling the via holes and screen-printing prescribed coil-looping conductor patterns (coil conductors) having a thickness of around 11 μm and drying.

The coil sheets are stacked in a prescribed order so that a coil having a looping axis in a direction parallel to the mounting surface is formed in the multilayer body after division into individual components. In addition, via sheets, in which via conductors serving as connection conductors are formed, are stacked above and below the coil sheets. The order in which the coil sheets are stacked is preferably determined so that the content percentage of the nonmagnetic material contained in the insulating layers changes from the first end surface 11 toward the second end surface 12 of the multilayer body 10. In addition, it is preferable that sheets composed of a material having a lower dielectric constant than the coil sheets be used as the via sheets.

The multilayer body is subjected to thermal pressure bonding in order to obtain a pressure-bonded body, and then the pressure-bonded body is cut into pieces of a predetermined chip size to obtain individual chips. The divided chips may be processed using a rotary barrel in order to round the corner portions and edge portions thereof.

Binder removal and firing is performed at a predetermined temperature and for a predetermined period of time, and fired bodies (multilayer bodies) having a built-in coil are obtained.

The chips are dipped at an angle in a layer obtained by spreading a Ag paste to a predetermined thickness and baked to form a base electrode for an outer electrode on four surfaces (a main surface, an end surface, and both side surfaces) of the multilayer body. In the above-described method, the base electrode can be formed in one go in contrast to the case where the base electrode is formed separately on the main surface and the end surface of the multilayer body in two steps.

Formation of the outer electrodes is completed by sequentially forming a Ni film and a Sn film having predetermined thicknesses on the base electrodes by performing plating. The multilayer coil component 1 according to the embodiment of the present disclosure can be manufactured as described above.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:
    a multilayer body that is formed by stacking a plurality of insulating layers on top of one another and that has a coil built into the inside thereof, the coil being formed by electrically connecting a plurality of coil conductors, which are stacked together with insulating layers, to one another, the insulating layers located between the coil conductors being composed of a material containing at least one of a magnetic material and a non-magnetic material, and the multilayer body has a first end surface and a second end surface, which face each other in a length direction, and a content percentage of the non-magnetic material contained in the insulating layers changes in a direction from the first end surface toward the second end surface of the multilayer body, the insulating layers comprising five or more insulating layers, and the content percentage of the non-magnetic material in each of the five or more insulating layers is different, a first main surface and a second main surface, which face each other in a height direction perpendicular to the length direction, the first main surface being a mounting surface, and a stacking direction of the multilayer body and an axial direction of the coil being parallel to the mounting surface, and a first side surface and a second side surface, which face each other in a width direction perpendicular to the length direction and the height direction; and a first outer electrode and a second outer electrode that are electrically connected to the coil, the first outer electrode being arranged so as to cover part of the first end surface and so as to extend from the first end surface and cover part of the first main surface, and the second outer electrode being arranged so as to cover part of the second end surface and so as to extend from the second end surface and cover part of the first main surface.

2. The multilayer coil component according to claim 1, wherein
the non-magnetic material includes an oxide material containing Si and Zn.

3. The multilayer coil component according to claim 2, wherein
content of Zn relative to Si (Zn/Si) lies in a range of around 1.8 to 2.2 in terms of a molar ratio.

4. The multilayer coil component according to claim 2, wherein
the non-magnetic material further includes Cu.

5. The multilayer coil component according to claim 1, wherein
the non-magnetic material includes a material obtained by adding a filler to a glass material containing Si, K, and B, and
the filler contains at least one selected from a group consisting of quartz and alumina.

6. The multilayer coil component according to claim 5, wherein
the glass material contains Si in the form of $SiO_2$ at around 70 to 85 wt %, B in the form of $B_2O_3$ at around 10 to 25 wt %, K in the form of $K_2O$ at around 0.5 to 5 wt %, and Al in the form of $Al_2O_3$ at around 0 to 5 wt %.

7. The multilayer coil component according to claim 1, wherein
the magnetic material is a Ni-Zn-Cu ferrite material.

8. The multilayer coil component according to claim 7, wherein
the ferrite material contains Fe in the form of $Fe_2O_3$ at around 40 to 49.5 mol %, Zn in the form of ZnO at around 2 to 35 mol %, Cu in the form of CuO at around 6 to 13 mol %, and Ni in the form of NiO at around 10 to 45 mol %.

9. The multilayer coil component according to claim 1, further comprising:
a first connection conductor and a second connection conductor inside the multilayer body;
wherein
the first connection conductor is connected in a straight line between a part of the first outer electrode that covers the first end surface and the coil conductor that faces the first outer electrode, and
the second connection conductor is connected in a straight line between a part of the second outer electrode that covers the second end surface and the coil conductor that faces the second outer electrode.

10. The multilayer coil component according to claim 9, wherein
the first connection conductor and the second connection conductor overlap the coil conductors in a plan view from the stacking direction and are located closer to the mounting surface than a center axis of the coil.

11. The multilayer coil component according to claim 3, wherein
the non-magnetic material further includes Cu.

12. The multilayer coil component according to claim 2, wherein
the magnetic material is a Ni-Zn-Cu ferrite material.

13. The multilayer coil component according to claim 3, wherein
the magnetic material is a Ni-Zn-Cu ferrite material.

14. The multilayer coil component according to claim 4, wherein
the magnetic material is a Ni-Zn-Cu ferrite material.

15. The multilayer coil component according to claim 5, wherein
the magnetic material is a Ni-Zn-Cu ferrite material.

16. The multilayer coil component according to claim 6, wherein
the magnetic material is a Ni-Zn-Cu ferrite material.

17. The multilayer coil component according to claim 2, further comprising:
a first connection conductor and a second connection conductor inside the multilayer body;
wherein
the first connection conductor is connected in a straight line between a part of the first outer electrode that covers the first end surface and the coil conductor that faces the first outer electrode, and
the second connection conductor is connected in a straight line between a part of the second outer electrode that covers the second end surface and the coil conductor that faces the second outer electrode.

18. The multilayer coil component according to claim 3, further comprising:
a first connection conductor and a second connection conductor inside the multilayer body;
wherein
the first connection conductor is connected in a straight line between a part of the first outer electrode that covers the first end surface and the coil conductor that faces the first outer electrode, and
the second connection conductor is connected in a straight line between a part of the second outer electrode that covers the second end surface and the coil conductor that faces the second outer electrode.

19. The multilayer coil component according to claim 4, further comprising:
a first connection conductor and a second connection conductor inside the multilayer body;

wherein
the first connection conductor is connected in a straight line between a part of the first outer electrode that covers the first end surface and the coil conductor that faces the first outer electrode, and the second connection conductor is connected in a straight line between a part of the second outer electrode that covers the second end surface and the coil conductor that faces the second outer electrode.

20. The multilayer coil component according to claim 5, further comprising:

a first connection conductor and a second connection conductor inside the multilayer body;

wherein the first connection conductor is connected in a straight line between a part of the first outer electrode that covers the first end surface and the coil conductor that faces the first outer electrode, and the second connection conductor is connected in a straight line between a part of the second outer electrode that covers the second end surface and the coil conductor that faces the second outer electrode.

\* \* \* \* \*